(12) United States Patent
Mori (10) Patent No.: US 8,274,576 B2
(45) Date of Patent: Sep. 25, 2012

(54) STILL IMAGE AND MOVING IMAGE CAPTURING DEVICE

(75) Inventor: Keiichi Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 79 days.

(21) Appl. No.: 12/887,983

(22) Filed: Sep. 22, 2010

(65) Prior Publication Data

US 2011/0013033 A1    Jan. 20, 2011

Related U.S. Application Data

(63) Continuation of application No. PCT/JP2009/001936, filed on Apr. 28, 2009.

(30) Foreign Application Priority Data

Jul. 2, 2008 (JP) ................. 2008-173464

(51) Int. Cl.
*H04N 5/225* (2006.01)
*H04N 3/14* (2006.01)
*H04N 5/335* (2006.01)

(52) U.S. Cl. ............. 348/220.1; 348/294; 348/302; 348/312; 348/317; 348/319

(58) Field of Classification Search ............ 348/220.1, 348/294, 302, 312, 317, 319
See application file for complete search history.

(56) References Cited

U.S. PATENT DOCUMENTS

| 7,349,016 | B2 | 3/2008 | Fujii et al. | |
|---|---|---|---|---|
| 7,400,353 | B2 | 7/2008 | Hatano | |
| 2002/0145669 | A1* | 10/2002 | Umeda et al. | 348/220.1 |
| 2005/0062872 | A1* | 3/2005 | Nakashima et al. | 348/349 |
| 2007/0115367 | A1* | 5/2007 | Yoshida et al. | 348/220.1 |
| 2007/0222867 | A1* | 9/2007 | Murata et al. | 348/222.1 |
| 2007/0236592 | A1* | 10/2007 | Kato | 348/311 |

FOREIGN PATENT DOCUMENTS

| JP | 2004-312140 | 11/2004 |
|---|---|---|
| JP | 2005-092081 | 4/2005 |
| JP | 2005-107252 | 4/2005 |
| JP | 2005-277513 | 10/2005 |

* cited by examiner

*Primary Examiner* — Jason Chan
*Assistant Examiner* — Stephen Coleman
(74) *Attorney, Agent, or Firm* — McDermott Will & Emery LLP (57) ABSTRACT

When still images are captured, signals read from all pixel cells of a pixel cell array having a Bayer array of color filters are selected, as a first output to be recorded and displayed, by an output selector. When moving images are captured, a 9-pixel binned signal is selected as the first output by the output selector, and a differential component between an output signal of a pixel cell located at the center-of-mass position of the 9 pixels, and the 9-pixel binned signal, is supplied as a second output from a memory circuit. Contrast information of a subject image is acquired based on the second output to perform lens focus adjustment.

8 Claims, 9 Drawing Sheets

STILL IMAGE AND MOVING IMAGE CAPTURING DEVICE

CROSS-REFERENCE TO RELATED APPLICATIONS

This is a continuation of PCT International Application PCT/JP2009/001936 filed on Apr. 28, 2009, which claims priority to Japanese Patent Application No. 2008-173464 filed on Jul. 2, 2008. The disclosures of these applications including the specifications, the drawings, and the claims are hereby incorporated by reference in their entirety.

BACKGROUND

The present disclosure relates to devices which electrically generate, display, or record still images and moving images, such as imaging elements used in digital still cameras, digital camcorders, or mobile camera telephones.

For recent digital still cameras, there has been a trend toward enhancing the function of capturing high-definition still images using a single-color-solid-state-sensor imaging element having a larger number of pixels, and significant advances have been made in that function. Meanwhile, for digital still cameras whose main function is to capture still images, higher image quality and higher performance have also been required for the function of capturing and recording moving images, which is conventionally a secondary function, particularly as HDTV players and televisions have become widespread. Under these circumstances, a pixel binning technique capable of simultaneously achieving high-definition still images and high-quality moving images has been proposed which is implemented by a method of driving an imaging element or an internal structure of an imaging element (see Japanese Patent Publication No. 2004-312140).

However, in cameras which have a high-definition solid-state imaging element which requires high focusing accuracy and therefore require lens focus adjustment, if the pixel binning technique is employed in the solid-state imaging element in order to generate high-quality moving images during recording of moving images, a spatial low-pass filter (LPF) inevitably emerges, leading to attenuation of high spatial frequency components which can be recorded in the case of still images. Therefore, when the pixel binning operation is performed in the imaging element, it is difficult to perform lens focus adjustment which ensures focusing accuracy for capturing still images.

To solve this problem, a technique of performing so-called contrast AF has been proposed as follows. When a moving image generation mode is transitioned to a still image generation mode, control is temporarily transitioned to a mode (skip/read mode) in which information is read from all pixels in one of the horizontal and vertical directions without performing pixel binning in the solid-state imaging element, and reading is skipped for some pixels in the other direction. In this mode, the lens focus is adjusted by extracting spatial frequency components in a band required for ensuring the focusing accuracy of still images using pixel signals in the direction in which information is read from all pixels while shifting the focus position of the lens by a predetermined amount (see Japanese Patent Publication No. 2005-92081).

SUMMARY

However, in the technique described in Japanese Patent Publication No. 2005-92081, when the high-quality moving image generation mode is transitioned to the high-definition still image generation mode, control is transitioned to the skip/read mode of the solid-state imaging element for focus adjustment, and the focus adjustment is performed. Therefore, there is in principle a time lag in control being transitioned to the mode in which a still image is captured. As a result, basic performance that a momentary photo opportunity aimed by the user is captured, which is essentially required for shooting of still images, is reduced. Moreover, in moving images which are obtained in the skip/read mode of the solid-state imaging element for focus adjustment, a moire pattern is caused in the image by aliasing of high spatial frequency components because of the assumption that skipping of pixel reading is performed in one direction. As a result, the image quality of the moving image is significantly reduced, whereby the image becomes significantly unnatural, which is a problem.

In view of the aforementioned problems, the present disclosure has been made. The detailed description describes implementations of an imaging device which allows lens focus adjustment which ensures focusing accuracy required for still images while generating high-quality moving images, minimizes the time lag in transition to the start of shooting of a still image, and reduces or avoids unnatural images having low image quality.

An example imaging device of the present disclosure includes a solid-state imaging element including a plurality of pixel cells arranged in a matrix, an all-pixel reader configured to read all pixels to generate a still image, a pixel-binning reader configured to read a plurality of pixels in at least one of a row direction and a column direction, with pixel binning, to generate a moving image, and a pixel-component-in-binning-range reader configured to be capable of being operated simultaneously with the pixel-binning reader and read signal components of pixels within a spatial range within which pixel binning is performed by the pixel-binning reader. One of the all-pixel reader and the pixel-binning reader is working while the other is not active.

The example imaging device may further include a contrast detector configured to detect contrast information of a subject from the signal read out by the pixel-component-in-binning-range reader.

According to the present disclosure, moving images are generated from video signals read out by the pixel-binning reader of the solid-state imaging element, and contrast information of a subject image can be acquired from signals read out by the pixel-component-in-binning-range reader which is operated simultaneously with the pixel-binning reader. As a result, lens focus adjustment can be performed based on the contrast information of the subject image while generating a high-quality moving image, whereby moving image generation can be seamlessly transitioned to still image generation without a time lag, and therefore, a moving image and a still image can be seamlessly switched.

DETAILED DESCRIPTION

Two embodiments of the present disclosure will be described hereinafter with reference to the accompanying drawings. Note that the embodiments described below are only for illustrative purposes, and various changes and modifications can be made to the embodiments.

Figure 1:
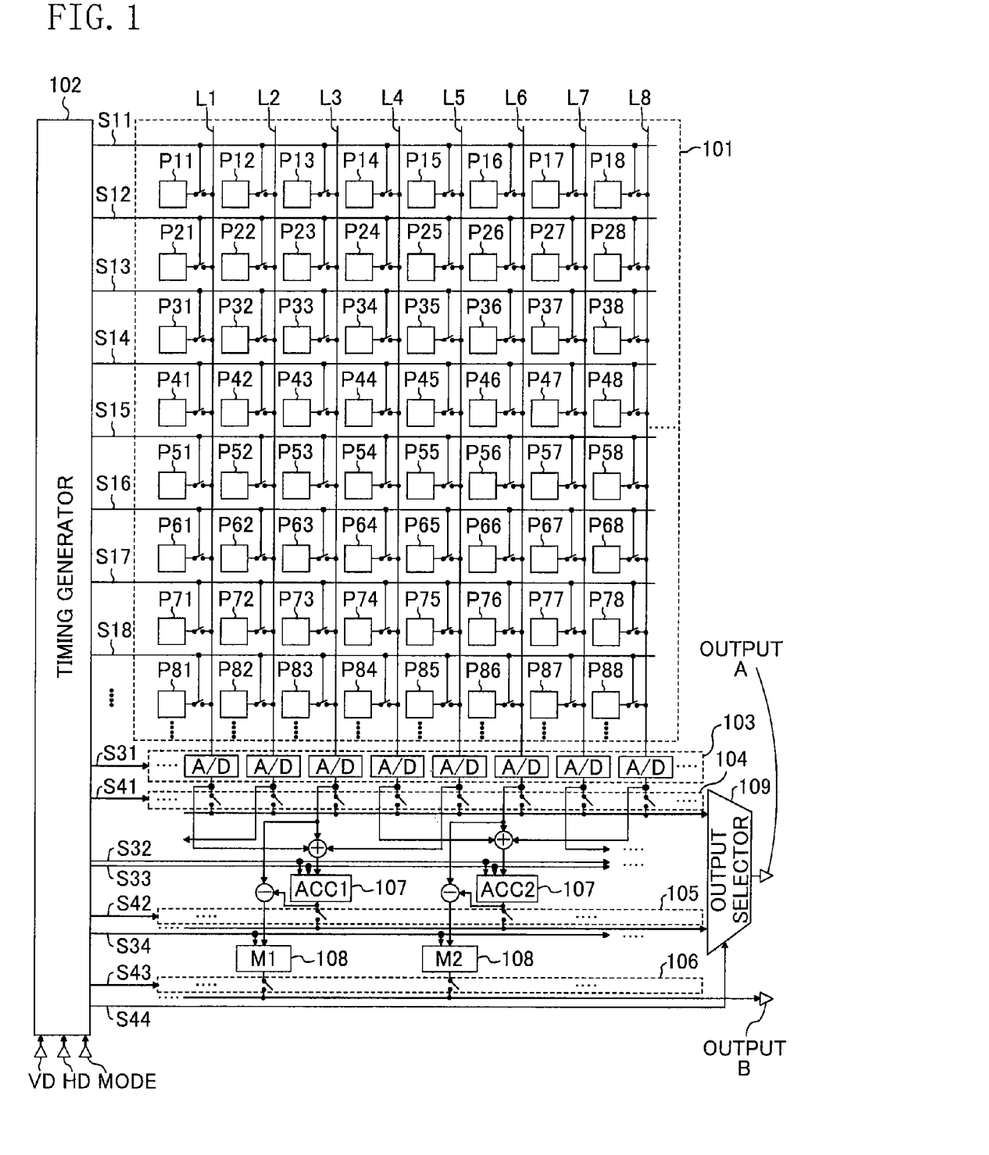
FIG. 1 is a block diagram showing a configuration of an imaging element in an imaging device according to a first embodiment of the present disclosure.

FIG. 1 shows a configuration of a single-sensor MOS imaging element for electronic cameras according to a first embodiment. The MOS imaging element includes a pixel cell array 101 including a plurality of pixel cells P11, P12, P13, and so on, on which color filters (e.g., in a Bayer array) are provided which perform color phase coding with respect to the pixel cells in units of 2 pixels×2 pixels (a detailed configuration of the MOS imaging element will be described later). The pixel cells P11, P12, P13, and so on of the pixel cell array 101 are connected via switching elements to common signal read lines L1, L2, L3, and so on and common signal read lines (not shown) having a common configuration, which are provided for respective columns. A timing generator 102 supplies, to the switching elements, common select signals S11, S12, S13, and so on and select signals (not shown) having a common configuration, which are provided for respective rows. When the common select signal S11, S12, S13, or the like at the high level, which is a conduction signal, is input, analog video signals of pixel cells on the same row are simultaneously read out to the common signal read lines L1, L2, L3, and so on of all the columns.

The common signal read lines L1, L2, L3, and so on of all the columns are input to a column AD group 103 which includes AD converters, one for each column. The column AD group 103 is controlled in accordance with a control signal S31 input from the timing generator 102. The column AD group 103 starts AD conversion at a rising edge of the control signal S31 where the control signal S31 is transitioned from the low level to the high level, continues AD conversion during a period that the control signal S31 is at the high level, ends AD conversion at a falling edge of the control signal S31 where the control signal S31 is transitioned from the high level to the low level, and continues to output a digital video signal of each column which is the result of AD conversion during a period that the control signal S31 is at the low level.

A digital video signal output from each column of the column AD group 103 is input to a first horizontal scanning selector 104. The first horizontal scanning selector 104 sequentially selects and outputs to an output selector 109 the digital video signals output from the column AD group 103, starting from the leftmost one (in the drawing), in accordance with a control signal S41 at the high level input from the timing generator 102 and in synchronization with reference clocks (not shown). The digital video signals output from the column AD group 103 are also input to adders. Specifically, the digital signals of three common signal read lines provided every other column (e.g., L1, L3, and L5) are input to one adder, which adds the three signals. One adder is provided for each set of digital signal output lines corresponding to the common signal read lines of three columns, and therefore, the number of the adders is equal to the quotient obtained by dividing the number of pixel cells in the row direction by three. In FIG. 1, the digital video signals obtained by AD conversion of the video signals from the common signal read lines L1, L3, and L5 are input to one adder, and the digital video signals obtained by AD conversion of the video signals from the common signal read lines L4, L6, and L8 are input to another adder. The digital signal output from each adder is input to a corresponding cumulative addition normalizer 107. The cumulative addition normalizer 107 resets a cumulative addition value to zero in accordance with a control signal S32 at the high level input from the timing generator 102, adds the product of the digital signal input from the adder by ⅕ to the previous cumulative addition value every time a high pulse of the control signal S33 is input, and holds the output during a period that the control signal S33 is at the low level.

The output of each cumulative addition normalizer 107 is supplied to a second horizontal scanning selector 105 and a corresponding subtractor. The second horizontal scanning selector 105 sequentially selects and outputs to the output selector 109 the digital signals output from the cumulative addition normalizers 107, starting from the leftmost one (in the drawing), in accordance with a control signal S42 at the high level input from the timing generator 102 and in synchronization with reference clocks (not shown). Each subtractor receives the output of the corresponding cumulative addition normalizer 107 and the digital video signal of a column which is located at the spatial center in the column direction of the corresponding three columns of the column AD group 103 which are connected to one adder, and outputs a subtraction difference value to a memory circuit 108. In FIG. 1, the outputs of the AD converters connected to the common signal read lines L3 and L6 are input to the respective corresponding subtractors.

The memory circuit 108 latches inputs from the subtractors in accordance with a high pulse of a control signal S34 input from the timing generator 102, and stores, holds, and outputs the inputs to a third horizontal scanning selector 106 during a period that the control signal S34 is at the low level. The third horizontal scanning selector 106 sequentially selects the digital signals output from the memory circuit 108 in the order from the leftmost one to the rightmost one in the drawing in accordance with a control signal S43 at the high level input from the timing generator 102 and in synchronization with reference clocks (not shown), and outputs the digital signals as outputs B.

The timing generator 102 receives a vertical synchronization signal VD and a horizontal synchronization signal HD, and a mode select signal MODE for designating an all-pixel read mode or a pixel-binning read mode.

The timing generator 102 outputs a control signal S44 to the output selector 109. The timing generator 102, when the mode select signal MODE designates the all-pixel read mode, controls the output selector 109 so that a digital video signal input from the first horizontal scanning selector 104 to the output selector 109 is selected and output as an output A, and when the mode select signal MODE designates the pixel-binning read mode, controls the output selector 109 so that a digital video signal input from the second horizontal scanning selector 105 to the output selector 109 is selected and output as the output A.

Figure 2:
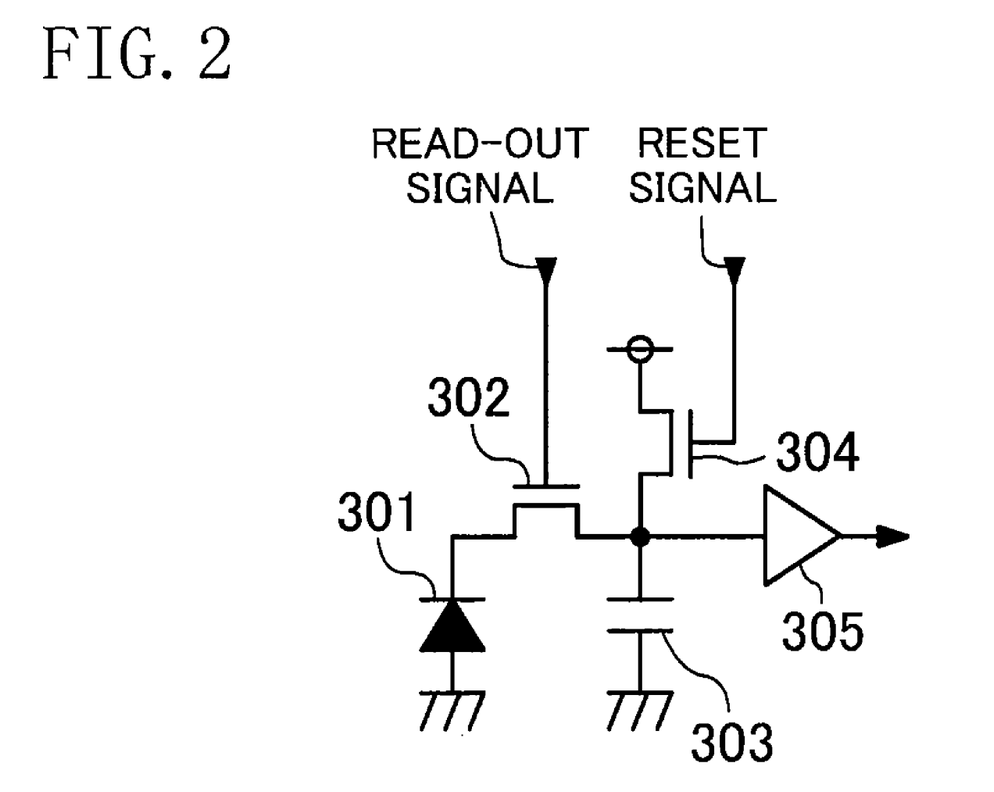
FIG. 2 is a diagram showing an equivalent circuit of each pixel cell of FIG. 1.

FIG. 2 shows an equivalent circuit of the pixel cell. In the equivalent circuit, light entering a photodiode 301 is converted to electronic charge, which is then read out via a read transistor 302 to the gate of which a read-out signal is connected, to a floating diffusion 303, which then converts the electric charge to a voltage. The floating diffusion 303 is reset via a reset transistor 304 to the gate of which a reset signal is input, before electric charge is read from the photodiode 301. The voltage of the floating diffusion 303 is connected to a corresponding one of the common signal read lines L1, L2, L3, and so on of the columns via an amplifier 305 and a switching element (not shown in FIG. 2).

For example, the output of the amplifier 305 of the pixel cell P11 in FIG. 1 is connected via a switching element to the common signal read line L1. Although signal lines for the read-out signal and the reset signal are not shown in FIG. 1, the timing generator 102 applies a common read-out signal and a common reset signal to all pixel cells on each row. Specifically, the floating diffusion 303 is reset by applying the reset signal and then the read-out signal is turned on, immediately before a high pulse (conduction signal) is applied to the common select signals S11, S12, S13, and so on and the select signals having the common configuration for the respective rows, whereby drive operation of reading out electric charge from the photodiode 301 to the floating diffusion 303 is performed on a row-by-row basis. As a result, an analog video signal which is proportional to light entering the photodiode 301 is output from the amplifier 305.

Figure 3:
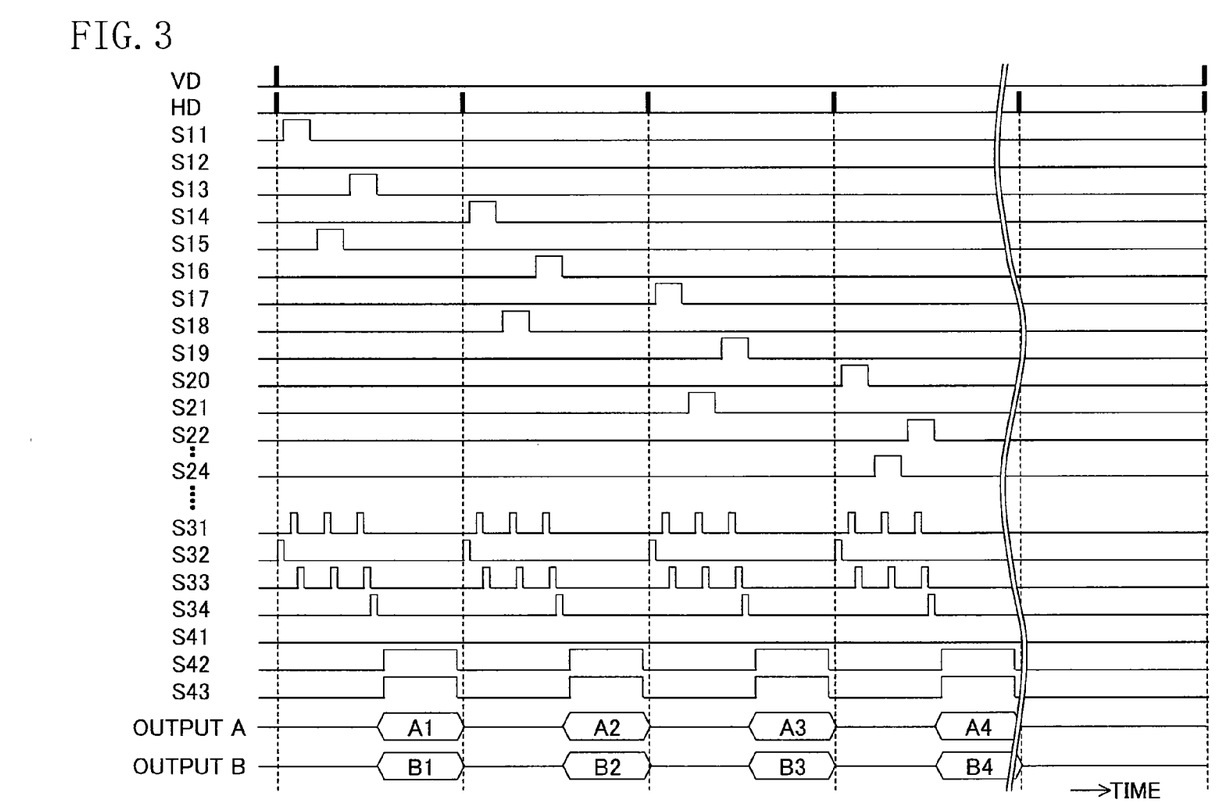
FIG. 3 is a timing diagram showing operation of the imaging element of FIG. 1 in a pixel-binning read mode.

Next, the pixel-binning read mode which is operation of the imaging element of FIG. 1 performed when moving images are captured will be described with reference to FIG. 3. The timing generator 102 selects the pixel-binning read mode in accordance with the mode select signal MODE. The output selector 109 selects a digital video signal input from the second horizontal scanning selector 105 and outputs the digital video signal as the output A.

The first horizontal synchronization period is started in synchronization with high pulses of the vertical synchronization signal VD and the horizontal synchronization signal HD input to the timing generator 102. The timing generator 102 outputs to the control signal S32 a pulse which resets the cumulative addition values of the cumulative addition normalizers 107 to zero in synchronization with the input high pulse of the horizontal synchronization signal HD. Thereafter, the select signal S11 at the high level is output, so that analog video signals of the pixel cells P11, P12, P13, P14, P15, and so on are connected to the common signal read lines L1, L2, L3, L4, L5, and so on. During a period that the select signal S11 is at the high level, the control signal S31 input from the timing generator 102 to the column AD group 103 is transitioned from the low level to the high level, so that the column AD group 103 starts AD conversion, and then the control signal S31 is transitioned from the high level to the low level, so that the AD converters of the column AD group 103 output and hold digital video signals which have been obtained by performing AD conversion with respect to analog video signals output from the amplifiers 305 of the pixel cells P11, P12, P13, P14, P15, and so on. At the same time, a digital video signal which is obtained by an adder adding the video signals of the pixel cells P11, P13, and P15 which are the outputs of the AD converters connected to the common signal read lines L1, L3, and L5, is input to the first cumulative addition normalizer (ACC1) 107, and a digital video signal which is obtained by an adder adding the video signals of the pixel cells P14, P16, and P18 which are the outputs of the AD converters connected to the common signal read lines L4, L6, and L8, is input to the second cumulative addition normalizer (ACC2) 107. The other digital video signals (not shown) which are similar combinations of video signals of pixel cells are input to the cumulative addition normalizers 107 which are provided, one for each combination of three columns. In this state, if the timing generator 102 inputs a high pulse of the control signal S33 to the cumulative addition normalizers 107, the first cumulative addition normalizer (ACC1) 107 outputs a digital video signal corresponding to (the output of P11)/9+(the output of P13)/9+(the output of P15)/9, and the second cumulative addition normalizer (ACC2) 107 outputs a digital video signal corresponding to (the output of P14)/9+(the output of P16)/9+(the output of P18)/9.

Next, the timing generator 102 outputs the select signal S15 at the high level (selected state), and successively outputs high pulses of the control signals S31 and S33 in a manner similar to that described above. As a result, the cumulative addition normalizer (ACC1) 107 outputs a digital video signal corresponding to (the output of P11)/9+(the output of P13)/9+(the output of P15)/9+(the output of P51)/9+(the output of P53)/9+(the output of P55)/9, and the cumulative addition normalizer (ACC2) 107 outputs a digital video signal corresponding to (the output of P14)/9+(the output of P16)/9+(the output of P18)/9+(the output of P54)/9+(the output of P56)/9+(the output of P58)/9.

Next, the timing generator 102 outputs the select signal S13 at the high level (selected state), and successively outputs high pulses of the control signals S31 and S33 in a manner similar to that described above. As a result, the cumulative addition normalizer (ACC1) 107 outputs a digital video signal obtained by binning a total of 9 pixels of the same color phase (3 pixels in the row direction×3 pixels in the column direction) corresponding to (the output of P11+the output of P13+the output of P15+the output of P31+the output of P33+the output of P35+the output of P51+the output of P53+the output of P55)/9 as a result of addition of (the output of P31)/9+(the output of P33)/9+(the output of P35)/9 to the previous cumulative addition value, and the cumulative addition normalizer (ACC2) 107 outputs a digital video signal obtained by binning a total of 9 pixels of the same color phase (3 pixels in the row direction×3 pixels in the column direction) corresponding to (the output of P14+the output of P16+the output of P18+the output of P34+the output of P36+the output of P38+the output of P54+the output of P56+the output of P58)/9 as a result of addition of (the output of P34)/9+(the output of P36)/9+(the output of P38)/9 to the previous cumulative addition value.

Next, a high pulse of the control signal S34 is input to the memory circuit 108 during a period that the select signal S13 is at the high level. As a result, the first memory circuit (M1) 108 records and holds P33−(the output of P11+the output of P13+the output of P15+the output of P31+the output of P33+the output of P35+the output of P51+the output of P53+the output of P55)/9, which is a subtraction difference value between the output of P33 which is the output of the AD converter connected to the common signal read line L3, and the output of the cumulative addition normalizer (ACC1) 107, i.e., a differential component between the 9-pixel binned signal of the same color phase and the output signal of a pixel cell located at the center position of the 9 pixels. The second memory circuit (M2) 108 records and holds P36−(the output of P14+the output of P16+the output of P18+the output of P34+the output of P36+the output of P38+the output of P54+the output of P56+the output of P58)/9, which is a subtraction difference value between the output of P36 which is the output of the AD converter connected to the common signal read line L6, and the output of the cumulative addition normalizer (ACC2) 107, i.e., a differential component between the 9-pixel binned signal of the same color phase which is different from that of the first memory circuit (M1) 108 and the output signal of a pixel cell located at the center position of the 9 pixels.

Next, the timing generator 102 outputs the control signal S42 at the high level to operate the second horizontal scanning selector 105, and also outputs the control signal S43 at the high level to operate the third horizontal scanning selector 106. As a result, for the pixel cells P11, P12, P13, P14, P15, and so on, P31, P32, P33, P34, P35, and so on, and P51, P52, P53, P54, P55, and so on connected to the common signal read lines via the switching elements to which the select signals S11, S13, and S15 are connected, video signals each obtained by binning 9 pixels of the same color phase are successively output as the outputs A in the order of location in the row direction at a timing A1 shown in FIG. 3. Differential component signals each indicating a difference between the 9-pixel binned signal of the same color phase and the output signal of a pixel cell located at the center position (i.e., the center-of-mass position) of the 9 pixels are successively output as the outputs B in the order of location in the row direction at a timing B1 shown in FIG. 3.

Next, during the second horizontal synchronization period which starts in synchronization with a high pulse of the horizontal synchronization signal HD, the timing generator 102 performs a timing control similar to that performed during the first horizontal synchronization period with respect to pixel cells connected to the common signal read lines via the switching elements to which the select signals S14, S16, and S18 are connected. As a result, for the pixel cells P41, P42, P43, P44, P45, and so on, P61, P62, P63, P64, P65, and so on, and P81, P82, P83, P84, P85, and so on, video signals each obtained by binning 9 pixels of the same color phase, e.g., a digital video signal corresponding to (the output of P41+the output of P43+the output of P45+the output of P61+the output of P63+the output of P65+the output of P81+the output of P83+the output of P85)/9, are successively output as the outputs A in the order of location in the row direction at a timing A2 shown in FIG. 3. Differential component signals each indicating a difference between the 9-pixel binned signal of the same color phase and the output signal of a pixel cell located at the center position (i.e., the center-of-mass position) of the 9 pixels, e.g., P63−(the output of P41+the output of P43+the output of P45+the output of P61+the output of P63+the output of P65+the output of P81+the output of P83+the output of P85)/9, are successively output as the outputs B in the order of location in the row direction at a timing B2 shown in FIG. 3. Similar operation is performed at timings A3 and B3, and A4 and B4 shown in FIG. 3.

Next, the all-pixel read mode which is operation of the imaging element of FIG. 1 performed when still images are captured will be described with reference to FIG. 4. The timing generator 102 selects the all-pixel read mode in accordance with the mode select signal MODE. The output selector 109 selects a digital video signal input from the first horizontal scanning selector 104 and outputs the digital video signal as the output A.

The first horizontal synchronization period is started in synchronization with high pulses of the vertical synchronization signal VD and the horizontal synchronization signal HD input to the timing generator 102. The timing generator 102 outputs the select signal S11 at the high level in synchronization with the input high pulse of the horizontal synchronization signal HD, so that the analog video signals of the pixel cells P11, P12, P13, P14, P15, and so on are simultaneously output to the common signal read lines L1, L2, L3, L4, L5, and so on. During a period that the select signal S11 is at the high level, the timing generator 102 transitions the control signal S31 input to the column AD group 103 from the low level to the high level, so that AD conversion is started. When the timing generator 102 transitions the control signal S31 from the high level to the low level, the AD converters of the column AD group 103 output and hold digital video signals which are the results of AD conversion with respect to the analog video signals of the pixel cells P11, P12, P13, P14, P15, and so on. Next, the timing generator 102 outputs the control signal S41 at the high level to operate the first horizontal scanning selector 104, so that the digital video signals of the pixel cells P11, P12, P13, P14, P15, and so on are successively output as the outputs A in the order of location in the row direction at a timing AA1 shown in FIG. 4.

Figure 4:
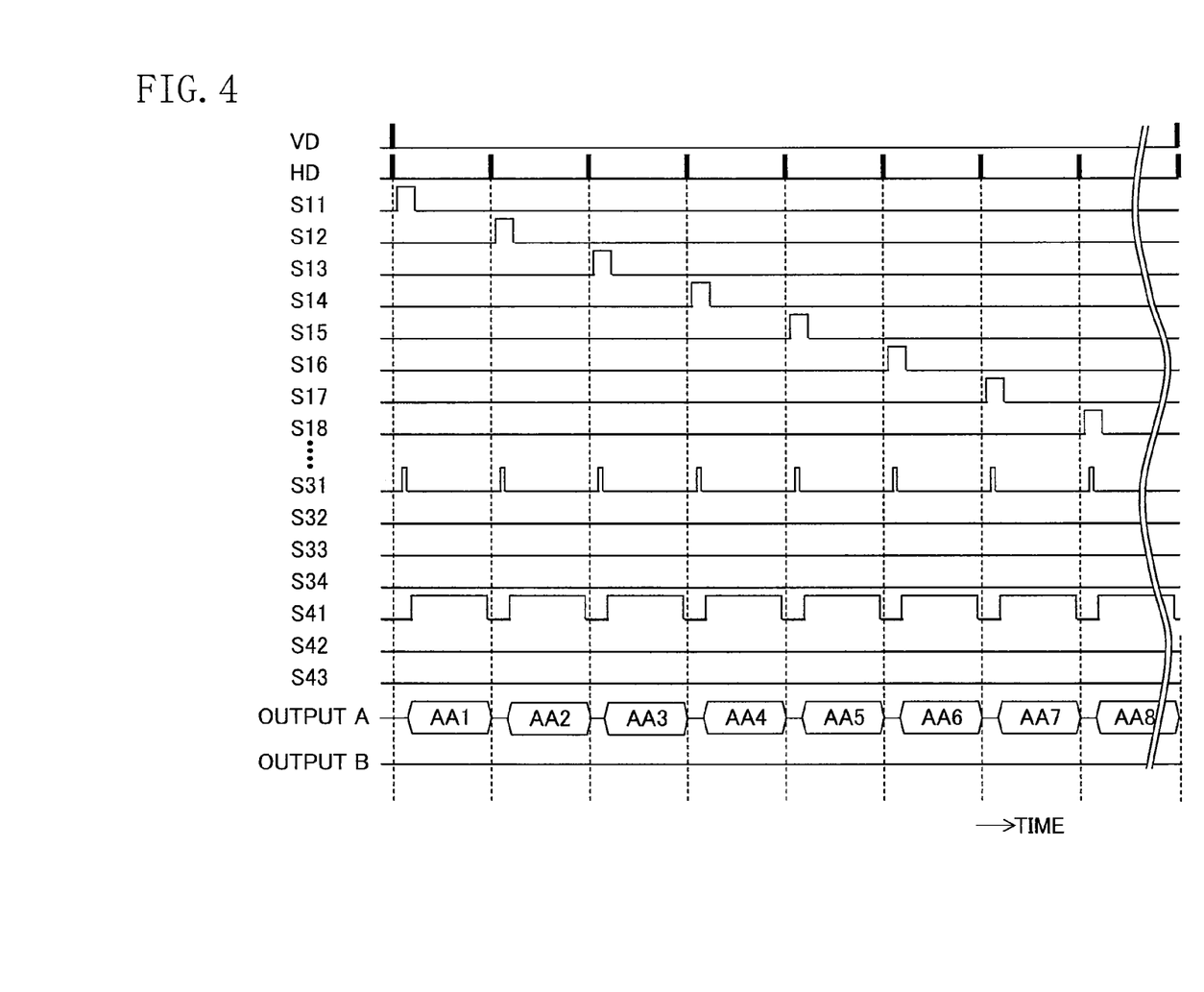
FIG. 4 is a timing diagram showing operation of the imaging element of FIG. 1 in an all-pixel read mode.

During the second horizontal synchronization period, the timing generator 102 performs a timing control similar to that during the first horizontal synchronization period with respect to the pixel cells which are connected to the common signal read lines via switching elements to which the select signal S12 is connected, so that the digital video signals of P21, P22, P23, P24, P25, and so on are successively output as the outputs A in the order of location in the row direction at a timing AA2 shown in FIG. 4. Similar operation is performed at timings AA3 to AA8 in FIG. 4. Thus, the video signals of pixel cells on one row are read out during one horizontal synchronization period, and rows to be read are changed on a row-by-row basis in the column direction, whereby information is read from all pixels in a raster scan pattern.

Next, an overall circuit configuration of an imaging device will be described with reference to FIG. 5. The imaging element 201, which is the imaging element of FIG. 1, receives optical information which is imaged by a lens unit 202, a vertical synchronization signal VD and a horizontal synchronization signal HD which are generated by a synchronization signal generator 203 in accordance with reference clocks (not shown), and a mode select signal MODE which is generated by a controller 206. Focus adjustment is performed with respect to the lens unit 202 by an optical focus adjustment mechanism and a lens drive unit 207 which electrically drives the optical focus adjustment mechanism using an actuator. The output A of the imaging element 201 is input to an image processing circuit 204. The image processing circuit 204 performs a spatial interpolation process with respect to a single-sensor color digital video signal to generate a YC video signal, and outputs the YC video signal to a medium recording circuit 208 and an image display circuit 210. On the other hand, the output B of the imaging element 201 is input to a contrast detecting circuit 205. The contrast detecting circuit 205 calculates an average value of pixel color components having color phases closest to a luminance component of pixel cells within a range which is previously set as a detection area with respect to the angle of view of the pixel cell array of the imaging element 201 (e.g., the output B corresponding to pixel cells having a green filter in the case of an imaging element having a Bayer array color filter array (CFA)), and outputs the average value as contrast information to the controller 206. A reference character 209 indicates a medium for recording images, and a reference character 211 indicates a display device for displaying images.

Figure 6:
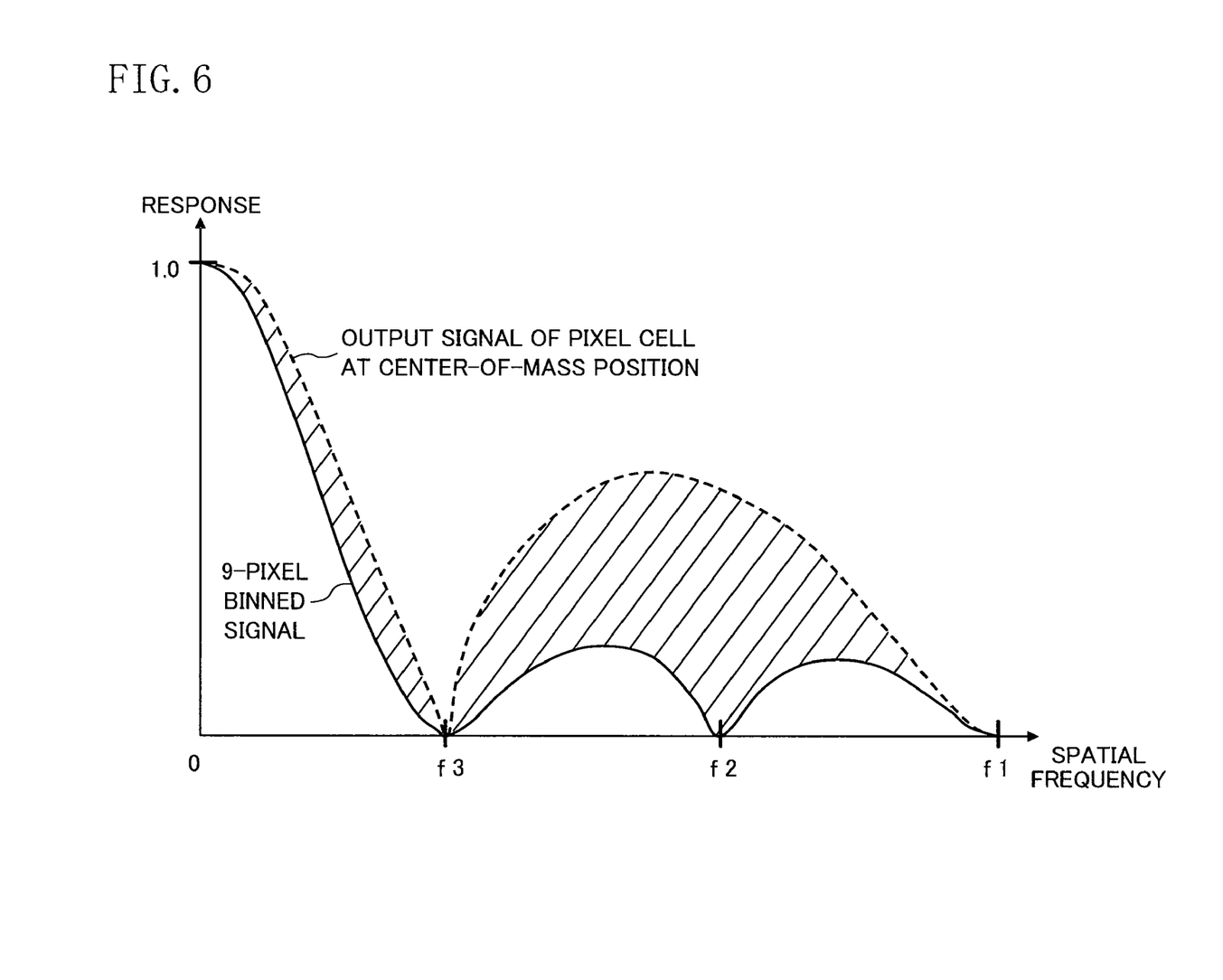
FIG. 6 is a spatial frequency characteristic diagram for describing a signal characteristic of an output B in FIG. 1.

Here, a signal characteristic of the output B will be described with reference to FIG. 6. In the graph of FIG. 6, the horizontal axis indicates spatial frequencies, where f1 is a Nyquist frequency of all pixels, f2 is ⅔ of the frequency f1, and f3 is ⅓ of the frequency f1. The vertical axis indicates responses. A solid curve indicates a spatial frequency characteristic of a 9-pixel binned signal obtained in the pixel-binning read mode, and a dashed curve indicates a spatial frequency characteristic of the output signal of a pixel located at the center position (i.e., the center-of-mass position) of 9 pixels corresponding to the 9-pixel binned signal. The output B is a differential component between the 9-pixel binned signal and the output signal of a pixel cell located at the center-of-mass position of the 9 pixels, i.e., a signal including components in the hatched portion. Therefore, a signal obtained by averaging the outputs B within a predetermined area correctly indicates the focus state of the lens with respect to the YC video signal when the video signals of all pixels read out in the all-pixel read mode are generated by the image processing circuit 204. The magnitude of the signal corresponds to the contrast value which is high when a focus is established and decreases as a subject is further away from the focus.

Figure 5:
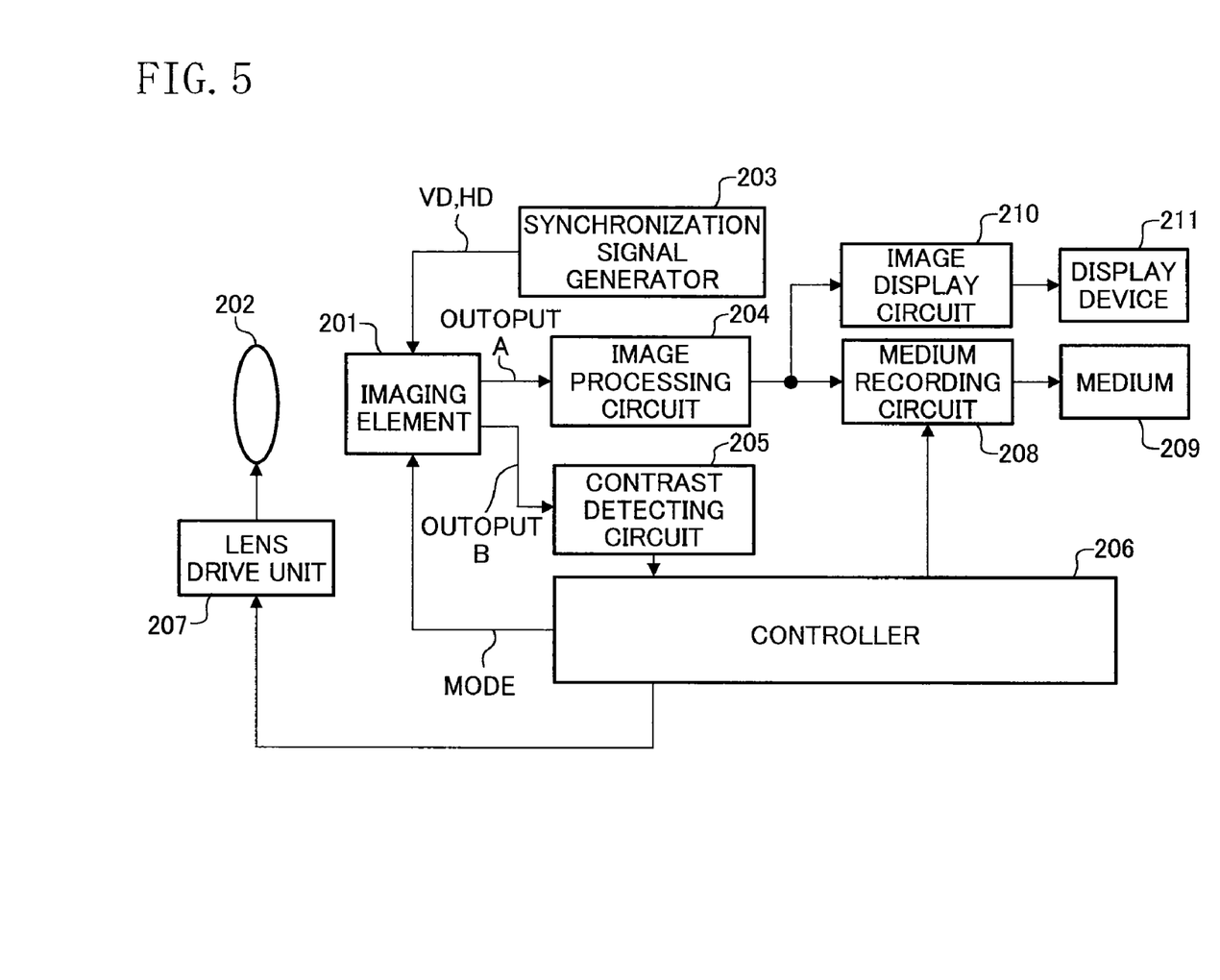
FIG. 5 is a block diagram showing an overall circuit configuration of an imaging device employing the imaging element of FIG. 1.

The medium recording circuit 208 of FIG. 5, when instructed to perform moving image recording in accordance with an input signal from the controller 206, compresses (encodes) the YC video signal input from the image processing circuit 204 to generate a moving image file in the MPEG4 format and saves the moving image file into the medium 209. The medium recording circuit 208, when instructed to perform still image recording, compresses the YC video signal to generate an image file in the JPEG format and records the image file into the medium 209. The medium recording circuit 208, when instructed to perform still image recording while performing moving image recording and even if the YC video signal output from the imaging element is changed from one in the pixel-binning read mode in which the number of pixels is reduced by 9-pixel binning to one in the all-pixel read mode, i.e., the pixel size is increased and the frame rate is therefore changed, resizes the pixel size from the YC video signal input to the previous pixel size of moving images, and compensates for the reduction in the frame rate using a video signal of a frame immediately previous to the frame rate change, thereby recording a still image file to the medium 209 without skipping moving image recording.

The image display circuit 210 converts the YC video signal input from the image processing circuit 204 to an interface signal for the display device 211, such as an LCD or the like, and outputs the interface signal.

The controller 206, when receiving an instruction to start recording of moving images by first operation of a user interface unit (not shown), activates the imaging element 201 in the pixel-binning read mode, and instructs the medium recording circuit 208 to start recording of moving images. In addition, the controller 206 tracks the magnitude of subject contrast information input from the contrast detecting circuit 205 while instructing the lens drive unit 207 to displace the focus by a predetermined distance, to detect a peak of the contrast (i.e., so-called hill-climbing AF). In this case, the subject contrast information contains a high spatial frequency component which cannot be detected in 9-pixel binned video signals due to the spatial LPF. Therefore, as described above, it is possible to perform focus adjustment which can provide a satisfactory level of focusing accuracy not only in moving images, but also in the all-pixel read mode.

The controller 206, when instructed to perform still image recording by second operation of the user interface unit while performing moving image recording, outputs a signal indicating selection of the all-pixel read mode to the imaging element 201, and instructs the medium recording circuit 208 to perform a still image compression process with respect to the YC video signal which has been output from the imaging element 201 in the all-pixel read mode and has been generated by the image processing circuit 204 while continuing moving image recording, and record a still image having a high resolution to the medium 209.

As described above, when the operation of the imaging element 201 is transitioned from the pixel-binning read mode for generating moving images to the all-pixel read mode, highly accurate focus adjustment which ensures the focus state of the YC video signal of all-pixel reading for generation of still images in the pixel-binning read mode can be performed without switching to a special drive mode of the imaging element 201 for focus adjustment. Therefore, the moving image generation state can be seamlessly transitioned without a time lag to still image recording by the user's second operation as in this embodiment, whereby an essential requirement for still images that a momentary photo opportunity aimed by the user is captured can be satisfied. When subject contrast information is obtained from video signals of all pixels, it is typically necessary to extract a specific spatial frequency component using a band-pass filter having a plurality of taps with respect to pixel cell outputs in a target area. In this embodiment, the output B is a signal which has a characteristic equivalent to that of a spatial band-pass filter, and therefore, means for detecting a contrast can be configured using a considerably small circuit scale, and only a small number of component circuits are operated, advantageously leading to a reduction in the power consumption. Moreover, the output B generated in the imaging element 201 is the difference between a component obtained by binning pixel cell outputs of 9 pixels of the same color phase and a pixel cell output component at the center-of-mass position, which highly correlate with each other. Therefore, encoding can be performed using a simple additional circuit, whereby the data length of the output B can be caused to be smaller than that of the output A, resulting in a further reduction in the power consumption.

Figure 7:
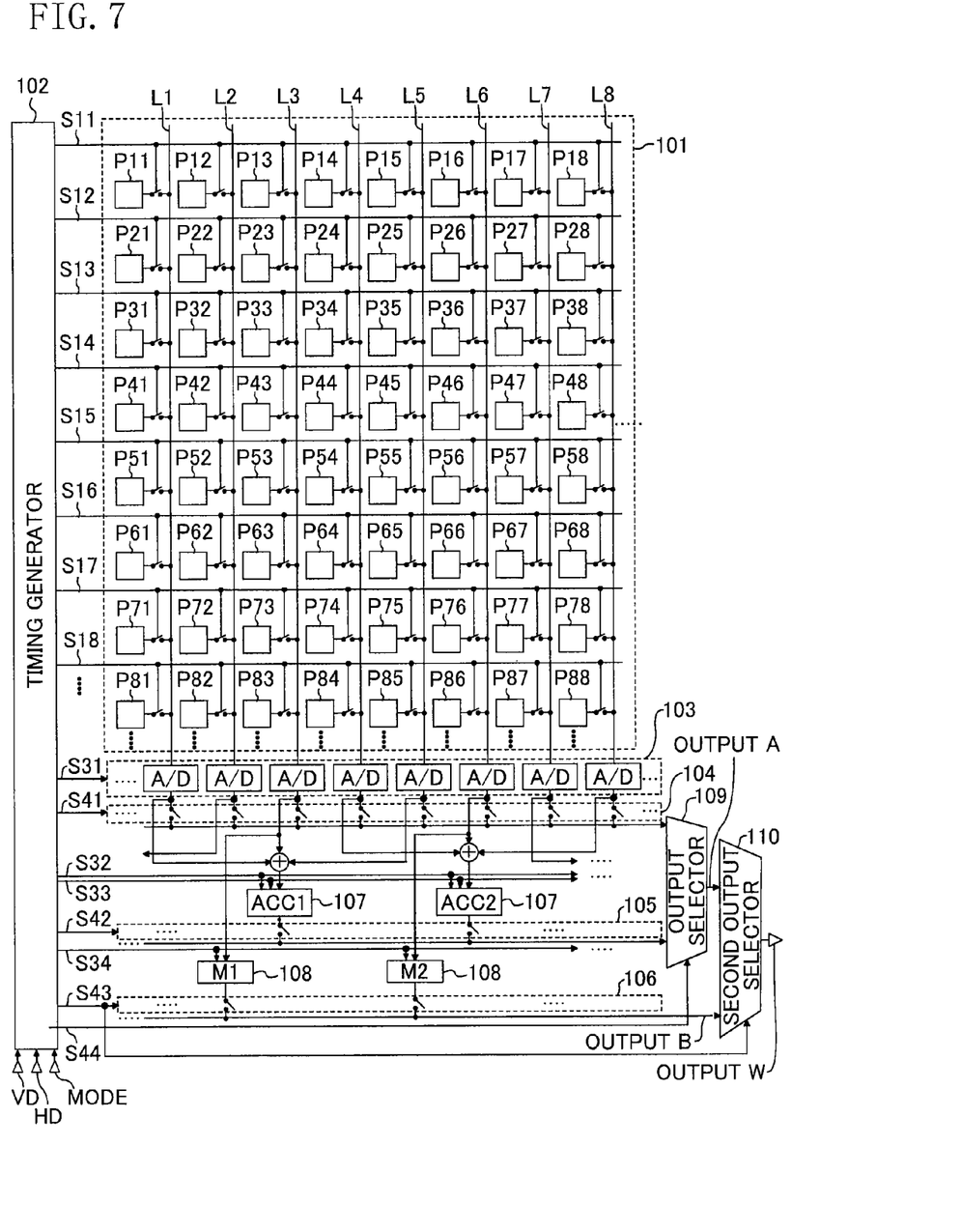
FIG. 7 is a block diagram showing a configuration of an imaging element in an imaging device according to a second embodiment of the present disclosure.

FIG. 7 is a diagram showing an imaging element according to a second embodiment. The second embodiment is different from the first embodiment of FIG. 1 in that the signal input to the memory circuit 108 is a video signal of a pixel cell located at the center in the column direction of the pixel binning range instead of the differential component signal between a video signal obtained by pixel binning and an output signal of a pixel cell located at the center-of-mass position of the pixel binning range, and in that an second output selector 110 is provided downstream from the outputs A and B. The second output selector 110 also receives, as a control signal, the control signal S43 which is output from the timing generator 102 and then input to the third horizontal scanning selector 106, and outputs, as an output W, the video signal of the output A input from the output selector 109 when the control signal S43 is at the low level, and the output B of the third horizontal scanning selector 106 when the control signal S43 is at the high level.

Next, a pixel-binning read mode which is operation of the imaging element of FIG. 7 performed when moving images are generated will be described with reference to FIG. 8. Timings of the select signals S11, S12, S13, S14, S15, and so on output from the timing generator 102, the control signal S31 input to the column AD group 103, the control signal S32 for resetting the cumulative addition normalizer 107, the control signal S33 for controlling cumulative addition, and the control signal S34 for controlling storage and holding of the memory circuit 108, with respect to the vertical synchronization signal VD and the horizontal synchronization signal HD, are similar to those of the first embodiment. After outputting a high pulse of the control signal S34 to the memory circuit 108 to instruct the memory circuit 108 to store and save data, the timing generator 102 outputs the control signal S42 at the high level to operate the second horizontal scanning selector 105. As a result, for example, during the first horizontal synchronization period, for the pixel cells P11, P12, P13, P14, P15, and so on, P31, P32, P33, P34, P35, and so on, and P51, P52, P53, P54, P55, and so on, video signals each obtained by binning 9 pixels of the same color phase are successively output via the output A from the output W in the order of location in the row direction at a timing A1 of FIG. 8. Thereafter, when a high pulse of the horizontal synchronization signal HD indicating the start of the second horizontal synchronization period is input, the timing generator 102 outputs the control signal S43 at the high level to operate the third horizontal scanning selector 106. As a result, video signals of the pixel cells P33, P36, and so on each located at the center position (i.e., the center-of-mass position) of 9 pixels binned at the timing A1 are successively output via the output B from the output W in the order of location in the row direction corresponding to A1 at a timing C1.

Next, at a timing A2 during the second horizontal synchronization period, for the pixel cells P41, P42, P43, P44, P45, and so on, P61, P62, P63, P64, P65, and so on, and P81, P82, P83, P84, P85, and so on, video signals each obtained by binning 9 pixels of the same color phase are successively output from the output W in the order of location in the row direction. At a timing C2 during the third horizontal synchronization period, video signals of P63, P66, and so on are successively output in the order of location in the row direction corresponding to A2. Similar operation is performed with respect to A3, C3, A4, and Cx shown in FIG. 8. In the all-pixel read mode in which still images are generated, the output A of FIG. 4 is output via the output W with the same control procedure as that of the first embodiment of FIG. 4.

Figure 9:
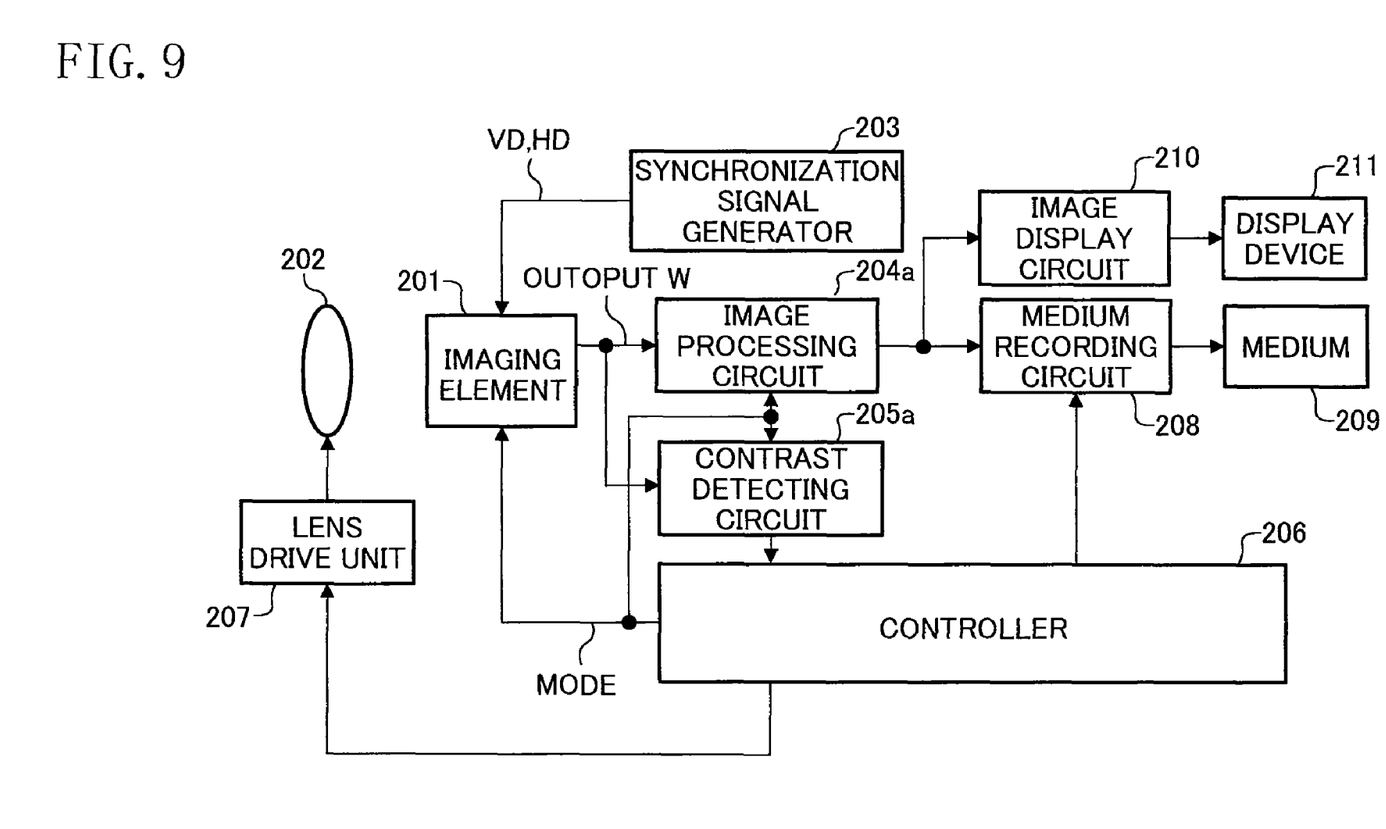
FIG. 9 is a block diagram showing an overall circuit diagram of an imaging device employing the imaging device of FIG. 7.

Next, an overall circuit configuration of an imaging device will be described with reference to FIG. 9. The imaging element 201 is the aforementioned imaging element of FIG. 7. The output W of the imaging element 201 is input to an image processing circuit 204a and a contrast detecting circuit 205a. The controller 206 outputs a mode select signal MODE designating a pixel-binning read mode or an all-pixel read mode to the imaging element 201, and in addition, to the image processing circuit 204a and the contrast detecting circuit 205a.

Figure 8:
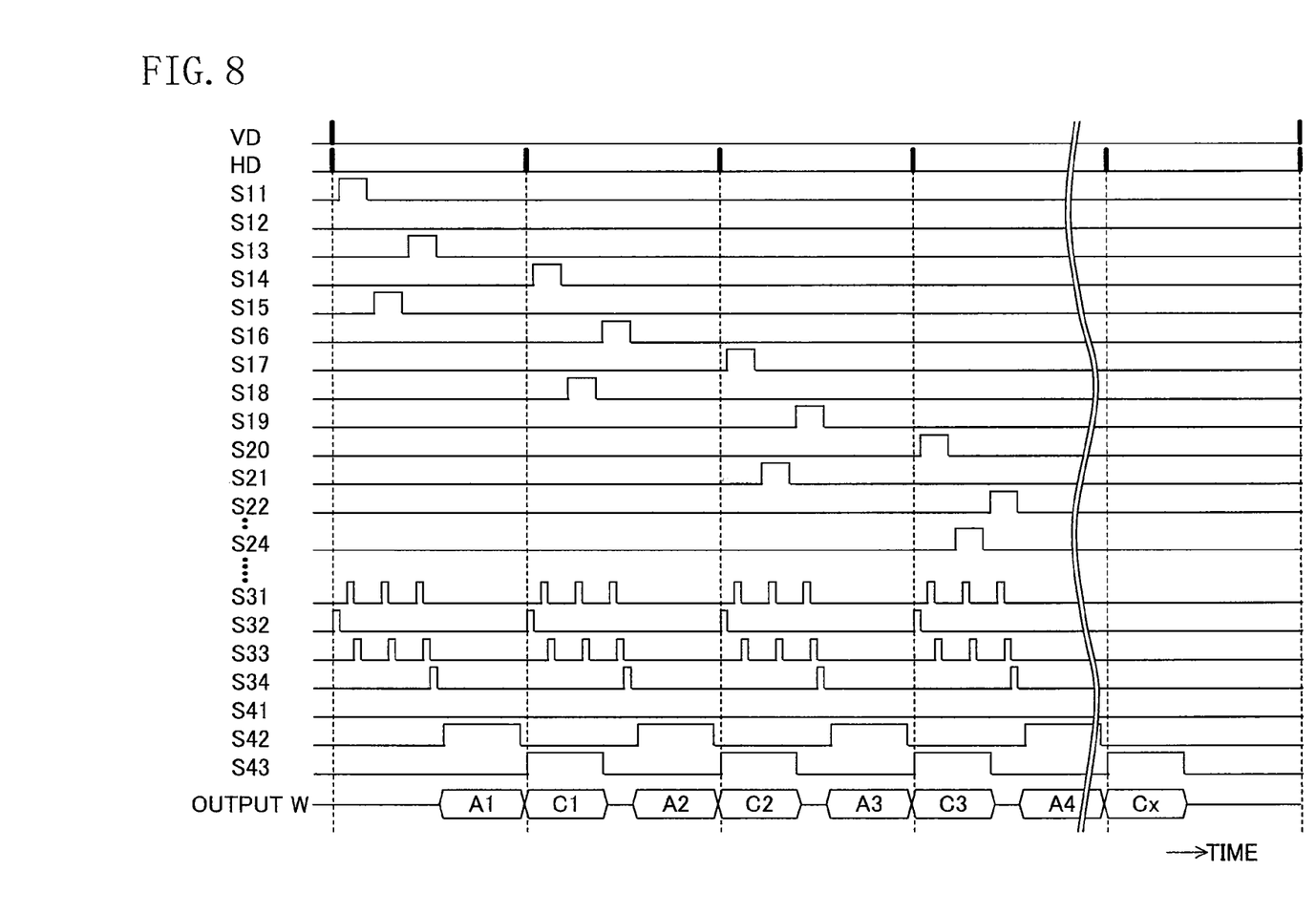
FIG. 8 is a timing diagram showing operation of the imaging element of FIG. 7 in a pixel-binning read mode.

When the mode select signal MODE indicates the pixel-binning read mode, the image processing circuit 204a generates YC video signals by performing a spatial interpolation process based on digital video signals each obtained by binning 9 pixel signals output at the timings A1, A2, A3, and so on of FIG. 8, and outputs the YC video signals to the medium recording circuit 208 and the image display circuit 210. When the mode select signal MODE indicates the all-pixel read mode, the image processing circuit 204a generates YC video signals from digital video signals of all pixel cells which are output during each horizontal synchronization period, and outputs the YC video signals to the medium recording circuit 208 and the image display circuit 210.

The contrast detecting circuit 205a is operated only in the pixel-binning read mode. The contrast detecting circuit 205a calculates a differential component between a 9-pixel binned signal input at the timing A1 of FIG. 8 and an output signal of a pixel cell located at the center-of-mass of the 9 binned pixel cells, which is input at the timing C1, on a pixel cell-by-pixel cell basis. The contrast detecting circuit 205a also calculates an average value of pixel color components having color phases closest to a luminance component of pixel cells within a range which is previously set as a detection area with respect to the angle of view of the pixel cell array of the imaging element 201 (e.g., an average value of the differential components corresponding to pixel cells having a green filter in the case of an imaging element having a Bayer array color filter array (CFA)), and outputs the average value as contrast information to the controller 206. The other configuration is the same as that of the first embodiment.

Thus, the contrast detecting circuit 205a can obtain contrast information having an effect similar to that of the contrast detecting circuit 205 of the first embodiment. Therefore, the moving image generation state can be seamlessly transitioned without a time lag to still image recording, whereby an essential requirement for still images that a momentary photo opportunity aimed by the user is captured can be satisfied. Moreover, in the second embodiment, during AD conversion with respect to the outputs of pixel cells on three target rows to be binned in the pixel-binning read mode, the output of a pixel cell at the center-of-mass position of each binning range which has been subjected to AD conversion during the previous horizontal synchronization period and then stored and held in the memory circuit 108, is read out. As a result, the output A and the output B are multiplexed into a single-line output with the reduction in the frame rate being smaller than that of the first embodiment, whereby the number of terminals of the imaging element 201 can be more reduced than in the first embodiment. Therefore, the size of the imaging element 201 itself can be reduced, and the sizes of electronic parts, such as an interconnect which is led from the imaging element 201, and the like, can be reduced. As a result, the overall size of the imaging device can be reduced without reducing the frame rate, which is an important moving image performance.

According to the present disclosure, it is possible to perform seamless transition to acquisition of high-resolution still images in which focus adjustment can be performed with high accuracy while acquiring good moving images having less moire, whereby a value-added combination of the still image capturing function and the moving image capturing function can be imparted to digital still cameras or digital camcorders. Moreover, the present disclosure is applicable to surveillance cameras, in-car event data recorders, and the like which require high-resolution still image recording at a specific event or scene while performing moving image recording.

What is claimed is:

1. A still image and moving image capturing device comprising:
    a solid-state imaging element including a plurality of pixel cells arranged in a matrix;
    an all-pixel reader configured to read all pixels to generate a still image;
    a pixel-binning reader configured to read a plurality of pixels in at least one of a row direction and a column direction, with pixel binning, to generate a moving image; and
    a pixel-component-in-binning-range reader configured to be capable of being operated simultaneously with the pixel-binning reader and read signal components of pixels within a spatial range within which pixel binning is performed by the pixel-binning reader, wherein:
    one of the all-pixel reader and the pixel-binning reader is working while the other is not active, and
    the signal read out by the pixel-component-in-binning-range reader contains a signal component of a pixel closest to a center-of-mass position of the pixels binned by the pixel-binning reader.

2. The still image and moving image capturing device of claim 1, wherein
    the solid-state imaging element has an array of color filters arranged in a matrix where color phase coding is performed in units of 2 pixels×2 pixels, and the pixel-binning reader bins pixels having the same color phase in units of a range formed by 2n+1 (n is a natural number) pixels in the row direction and 2m+1 (m is a natural number) pixels in the column direction, and the center-of-mass positions of the binned pixels have a pitch of 2n+1 pixels in the row direction and a pitch of 2m+1 pixels in the column direction.

3. The still image and moving image capturing device of claim 1, wherein
the signal read out by the pixel-component-in-binning-range reader contains a differential component between the signal component of the pixel closest to the center-of-mass position of the pixels binned by the pixel-binning reader, and a signal component of the binned pixels.

4. The still image and moving image capturing device of claim 2, wherein
the signal read out by the pixel-component-in-binning-range reader contains a differential component between a signal component of the pixels binned by the pixel-binning reader, and a signal component of a pixel located at a spatial center in each unit in which pixels having the same color phase are binned within the range formed by 2n+1 (n is a natural number) pixels in the row direction and 2m+1 (m is a natural number) pixels in the column direction.

5. The still image and moving image capturing device of claim 1, further comprising:
a contrast detector configured to detect contrast information of a subject from the signal read out by the pixel-component-in-binning-range reader.

6. The still image and moving image capturing device of claim 5, further comprising:
a lens configured to image a subject image onto the solid-state imaging element;
a focus adjuster configured to change a focus state of the lens on the solid-state imaging element; and
a controller configured to control focus adjustment of the focus adjuster based on the contrast information of the subject image obtained from the contrast detector so that a contrast of the subject image has a maximum amplitude.

7. The still image and moving image capturing device of claim 5, wherein
the contrast detector generates the contrast information of the subject image by averaging signal components of target pixels located within a predetermined area previously set in a light receiving area in which pixel cells of the solid-state imaging element are arranged, of target pixels from which signals are to be read out by the pixel-component-in-binning-range reader.

8. The still image and moving image capturing device of claim 1, wherein
the solid-state imaging element multiplexes the image signal read out by the pixel-binning reader and the signal read out by the pixel-component-in-binning-range reader to a single-line signal and outputs the single-line signal.

* * * * *